United States Patent [19]

Knowles et al.

[11] 4,109,248
[45] Aug. 22, 1978

[54] RADAR SYSTEMS

[75] Inventors: Philip Neville George Knowles, Aldwick; Christopher Pell, Horndean, both of England

[73] Assignee: Plessey Handel und Investments AG, Zug, Switzerland

[21] Appl. No.: 608,214

[22] Filed: Aug. 27, 1975

[30] Foreign Application Priority Data

Aug. 28, 1974 [GB] United Kingdom ............... 37504/74
Jun. 14, 1975 [GB] United Kingdom ............... 25484/75

[51] Int. Cl.² ............................................. G01S 9/56
[52] U.S. Cl. ............................................. 343/6.5 R
[58] Field of Search .......... 343/6.5 LC, 6.5 R, 6.5 SS

[56] References Cited

U.S. PATENT DOCUMENTS

| 3,754,251 | 8/1973 | Thornberg et al. | ............ 343/6.5 LC |
| 3,801,980 | 4/1974 | Danton et al. | ................ 343/6.5 LC |

FOREIGN PATENT DOCUMENTS 1,401,273 7/1975 United Kingdom ............... 343/6.5 LC

OTHER PUBLICATIONS

Benoit et al., *Plans & Developments for Air Traffic Systems,* 1975, pp. 21-1 to 21-8, May 1975.

*Primary Examiner*—Brooks H. Hunt
*Attorney, Agent, or Firm*—Fleit & Jacobson

[57] ABSTRACT

A secondary radar system for establishing the position and identity of aircraft etc. on airfields, particularly for controlling their ground movements during bad visibility, comprises a pair of spaced aerials each arranged to successively transmit a particular one of two interrogate pulses, the time relationship between the two pulses being varied such that a predetermined time relationship between the two interrogate pulses obtains at varying distances from said spaced aerials to afford selective interrogation of a transponder receiving the two interrogate pulses, and a third aerial spaced from the pair of spaced aerials for transmitting a further pulse in a second predetermined time relationship with one of the interrogate pulses whereby a selected transponder or transponders receiving said two interrogation pulses in said predetermined time relationship is caused to be suppressed.

17 Claims, 5 Drawing Figures

RADAR SYSTEMS

This invention relates to radar systems and relates more particularly to so-called secondary radar systems.

There is a growing demand for a means of establishing the position and identity of aircraft (and possibly road vehicles) on airfields, particularly for controlling their ground movements during bad visibility. In principle the aircraft secondary surveillance radar (SSR) transponder provides a basis for such a requirement, but the normal SSR system cannot be used for the following reasons:

(a) When two aircraft (within the aerial beam width) are separated in range by less than 1.6 miles there is a high probability that their reply trains will be garbled and their identities corrupted.

(b) The relatively large tolerance in transponder reply delay causes substantial range errors.

(c) The azimuth resolution in inadequate.

Problem (a) can be overcome by selective interrogation of individual aircraft and in the absence of a full selective address system (e.g. Adsel), it has been proposed that this could be achieved by radiating the two SSR interrogation pulses from separated omni-directional aerials placed on the airfield periphery. These pulses will only be received in the correct time relationship by aircraft at the correct relative distance from the two aerials and by altering the time relationship of the two transmitted pulses, aircraft at different relative distances can be interrogated. The interrogated transponder reply is then received by means of a directional aerial which is rotated to scan the airfield. The present invention relates to a system of this form in which the necessity of providing a rotating aerial is obviated.

According to one aspect of the present invention there is provided a method of and apparatus for selectively interrogating transponders carried by vehicles located within a predetermined area for the purpose of identifying and/or locating those vehicles, the method comprising the steps of radiating a first pair of interrogate pulses to cause the transponders located in a band of said area to be interrogated, determining the position of a required one of said transponders, radiating pairs of suppression pulses to cause all but a required one of the transponders in said band to be suppressed, radiating a second pair of interrogate pulses to cause the required one of said transponders to be interrogated preferably when the remaining transponders in the band are suppressed, and receiving the reply transmitted from the said one transponder for identification and/or location purposes.

In carrying out the method according to the said one aspect of the invention, the time relationship between the first pair of interrogate pulses may be varied in steps so that the predetermined area is traversed in step, it preferably being arranged that the predetermined area is traversed in one direction in a series of bands and is then traversed in the opposite direction in a series of bands.

In one arrangement for carrying out the invention according to the said one aspect, apparatus will be provided comprising first and second aerials located in the perimeter of the predetermined area in spaced apart relationship, the first and second aerials being arranged to radiate particular ones of the first pair of interrogate pulses, and a third aerial located on the perimeter of said area, the third aerial and the first or second aerial being arranged to radiate particular ones of the pairs of suppression pulses.

In another arrangement for carrying out the invention according to the said one aspect, apparatus will be provided comprising first and second aerials located on the perimeter of the predetermined area in spaced apart relationship, the first and second aerials being arranged to radiate particular ones of the first pair of interrogate pulses, and third and fourth aerials located on the perimeter of the predetermined area in spaced apart relationship, the third and fourth aerials being arranged to radiate particular ones of the pairs of suppression pulses.

Consequently the third aerial may be arranged to receive the reply of the required one of the transponders or alternatively at least three of the aerials may be arranged to receive the reply of the required one of the transponders for determining its position within the predetermined area.

According to another aspect of the present invention there is provided a method of and apparatus for selectively interrogating transponders located within a predetermined area for the purpose of identifying and/or locating those vehicles, the method comprising the steps of radiating a first pair of suppression pulses to cause transponders located in a first band of said area to be suppressed for a first predetermined period, radiating a second pair of suppression pulses to cause all the remaining transponders located within the predetermined area to be suppressed for a second predetermined period, and radiating a pair of interrogate pulses after the expiration of said first period but before the expiration of said second period to cause the transponders located in a second band of said area which is transverse to said first band to be interrogated, so that only those transponders that are located within the overlapping parts of said two bands are caused to be interrogated.

In carrying out the invention according to the said another aspect the time relationship between the suppression pulses and the time relationship between the interrogate pulses may be varied in steps so that the said one band is caused to traverse said area in one direction in steps and the said second band is caused to traverse the said area in another direction in steps, whereby the overlapping part of said two bands is caused to traverse the whole of the predetermined area for selective interrogation purposes and conveniently the predetermined area is caused to be traversed in hops so that immediate adjacent overlapping parts of said two bands are not interrogated one immediately after the other.

In another arrangement for carrying out the invention according to the said another arrangement, apparatus will be provided comprising first and second aerials located on the perimeter of the predetermined area in spaced apart relationship, the first and second aerials being arranged to radiate particular ones of the first pair of suppression pulses, and third and fourth aerials located on the perimeter of the predetermined area in spaced apart relationship and spaced from the first and second aerials, the third and fourth aerials being arranged to radiate particular ones of the pair of interrogate pulses.

In yet another arrangement at least five aerials will be provided located on the perimeter of the predetermined area, said aerials being associated in pairs for interrogation and suppression of particular parts of the predetermined area.

In carrying out the invention according to either of its aspects the so-called mode 3/A form of transponder interrogation is used, the so-called $P_1$ and $P_3$ pulses having a predetermined relationship therebetween being used for interrogation purposes and the so-called $P_1$ and $P_2$ pulses having another predetermined time relationship therebetween being used for suppression purposes.

Conveniently a further pulse having the said another predetermined relationship with the $P_3$ pulse is transmitted so that a transponder receiving the $P_1$ and $P_3$ pulses in said predetermined relationship but in reverse order is caused to be suppressed.

The presently used secondary surveillance radar (SSR) used by aircraft makes use of a transponder which is carried by each aircraft, the transponders being interrogated by a ground station to afford among other things identification of the aircraft. Interrogation of the aircraft transponders is effected using a so-called mode 3/A form of interrogation which consists of transmitting a pair of pulses typically at a frequency of 1030 MHz each of the pulses being 0.8µS wide and spaced 8µS apart. These pulses are commonly referred to as the $P_1$ and $P_3$ pulses respectively. A third pulse ($P_2$) may also be transmitted, the $P_2$ pulse being 0.8µS wide and spaced 2µS from the $P_1$ pulse, the $P_1$ and $P_2$ pulses being used to cause an aircraft transponder receiving them to be suppressed for a minimum period of 25µS. The present invention makes use of the existence of an aircraft's SSR transponder and the mode 3/A form of interrogation for ascertaining the position and identity of aircraft, and possibly any other vehicles that may be provided with transponders, on airfields.

Figure 1:
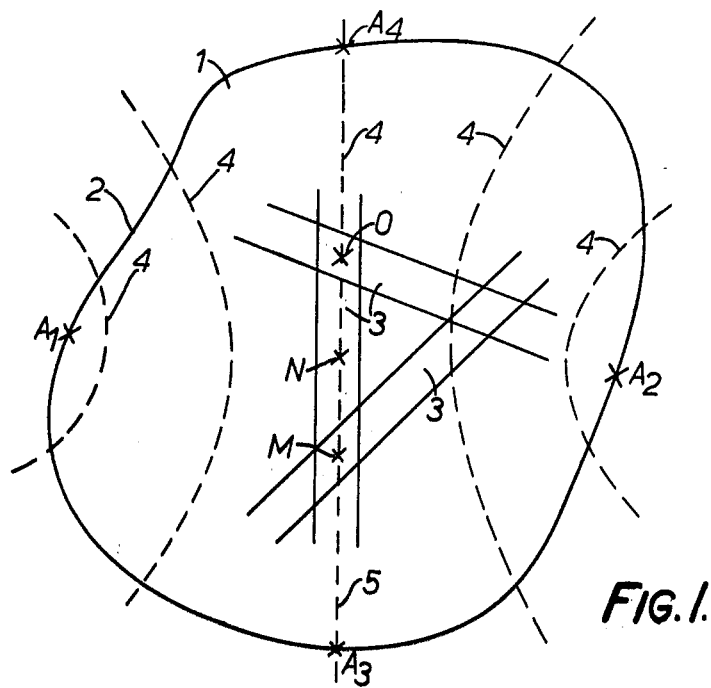
FIG. 1 is an airfield plan view showing omni-directional aerials $A_1$ through $A_4$.

Turning now to FIG. 1 of the drawings, this depicts a typical airfield 1 the boundary or perimeter of which is shown in full lines at 2 and which is provided with three runways 3. At opposite sides of the airfield 1 located on the perimeter 2 are two omni-directional aerials $A_1$ and $A_2$ which are arranged to transmit the $P_1$ and $P_3$ interrogate pulses respectively. These pulses will only be received in the correct time relationship by aircraft or other transponder-carrying vehicles at the correct relative distance from the two aerials and by altering the time relationship of the two transmitted pulses aircraft at different relative distances from the aerials can be interrogated. Thus a hyperbolic grid of selective interrogation may be established as shown in dashed lines at 4. One problem with this method of interrogation is that an aircraft may interpret the $P_1$ pulse as a $P_3$ pulse and vice-versa so that an aircraft in a "wrong" position receiving a $P_3$ pulse and then a $P_1$ pulse in the correct time relationship will be activated. This may be overcome by arranging that an additional pulse be transmitted by the aerial $A_2$, the additional pulse being delayed 2µS after the $P_3$ pulse so that an aircraft on the "wrong" position will interpret the $P_3$ pulse and the additional pulse as a $P_1$, $P_2$ pair which will cause it to be suppressed.

Now each aircraft transponder has a significant tolerance to $P_1$, $P_3$ timing which could cause loss of resolution. The effect of this may be minimised by arranging that the aerials $A_1$ and $A_2$ transmit the pulses $P_1$ and $P_3$ respectively with a varying time relationship so that a "sweep" in one direction across the airfield is made, the roles of the aerials $A_1$ and $A_2$ then being reversed and a sweep made in the other direction. This will increase the resolution in the presence of different and skewed transponder tolerances.

A further problem that may be encountered is that a number of aircraft may be disposed along a particular hyperbola, all of which will be caused to respond when the time relationship of the $P_1$ and $P_3$ pulses received by them is correct. This will result in their replies overlapping and their code information being corrupted. To overcome this it is proposed that a third omni-directional aerial $A_3$ is provided located on the perimeter 2 of the airfield and spaced from the aerials $A_1$ and $A_2$. For convenience, in the arrangement shown in the drawing the aerial $A_3$ is located equi-distance from the two aerials $A_1$ and $A_2$. The aerial $A_3$ is arranged to receive the overlapped and probably garbled replies from the aircraft on the same hyperbola e.g. the aircraft M, N and O on the hyperbola 5 and although the code data in these replies will be corrupted the positions of the aircraft can be extracted from their bracket pairs of pulses. With the positions of the aircraft M, N and O thus determined further $P_1$, $P_3$ interrogations are made with accompanying $P_2$ pulses from the aerial $A_3$ so timed as to cause suppression of all aircraft on the hyperbola except one, whose reply may then be received without garble. In order to improve the resolution along the hyperbola, it may be arranged that instead of transmitting $P_1$, $P_3$ and $P_2$ pulses as aforesaid, a succession of $P_1$, $P_2$ pulses may be transmitted at a rapid rate from the appropriate aerials so as to cause suppression of all but one aircraft on the hyperbola. This one aircraft may then be uniquely interrogated by a further $P_1$, $P_3$ pair within the minimum (25µS) suppression period of the unwanted aircraft.

Although, as has been hereinbefore mentioned, the position of an aircraft can be determined from the bracket pairs of pulses of a transponder reply a more accurate indication of position may be obtained by arranging that each of the aerials $A_1$, $A_2$ and $A_3$ receive the selected aircrafts reply and by using a trilateration technique to locate the position of the aircraft.

An extension of the arrangement so far described may be obtained by providing a fourth aerial $A_4$ which is used together with the aerial $A_3$ and in place of the aerial $A_1$ or $A_2$, to transmit the suppression pulses. In this way greater accuracy of suppression may be achieved.

However, both these arrangements suffers from relatively poor resolution due to the desensitization characteristic of conventional transponders. In such transponders it is arranged that after the receipt of a first pulse, it is desensitized so that it will not respond to a second pulse unless it is as large as or larger than the first pulse.

This poor resolution is minimised in the arrangements to be described with reference to FIGS. 2 to 5 of the accompanying drawings by using a double suppression technique in which all the transponders disposed on a given hyperbola are initially caused to be suppressed and then all the transponders on the airfield are caused to be suppressed. When the initially suppressed transponders become unsuppressed (i.e. after the 35μS nominal suppression period) but before the remainder of the transponders become unsuppressed, a selected part of the given hyperbola is interrogated to activate any transponders that are disposed in that part. By repeating the procedure and arranging that different parts of the given hyperbola are successively interrogated and by changing the time relationship of the initial suppression pulses so that all other hyperbolae are successively interrogated the entire airfield may be scanned.

Figure 2:
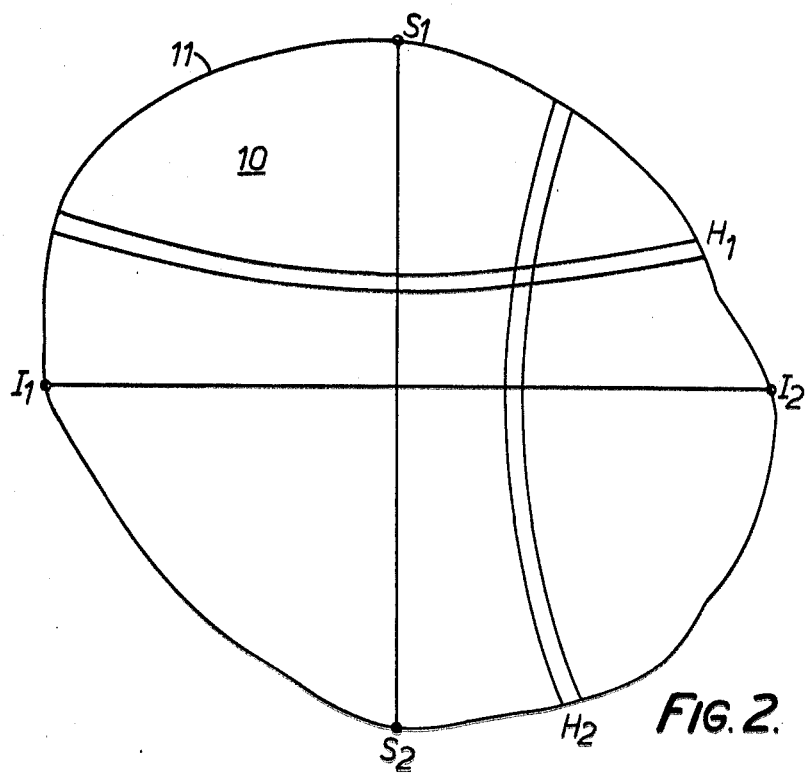
FIG. 2 is an airfield plan view showing omni-directional aerials $S_1$, $S_2$, $I_1$, and $I_2$.

Turning now to FIG. 2 of the accompanying drawings, this depicts an airfield 10 having a perimeter or boundary 11. Disposed on opposite sides of the airfield 10 and located on the perimeter 11 are two omni-directional aerials $S_1$ and $S_2$ and disposed orthogonally to these and also located in the perimeter 11 are two further omni-directional aerials $I_1$ and $I_2$. It is initially arranged that the aerials $S_1$ and $S_2$ radiate individual pulses so timed as to arrive at hyperbolic band $H_1$, for example, with a spacing of 2μS which will cause suppression of all transponders disposed within the hyperbolic band $H_1$ for a nominal period of 35μS. The thickness (typically 150 meters) of the hyperbolic band $H_1$ is determined by the tolerance of the transponders. Whilst the transponders disposed within the hyperbolic band $H_1$ are suppressed, it is arranged that one or both of the aerials $S_1$, $S_2$ is caused to radiate two further pulses which have a spacing of 2μS over the whole of the airfield 10, so that all of the transponders disposed on the airfield 10, apart from those disposed in hyperbolic band $H_1$ which are already suppressed, are caused to be suppressed. When the transponders disposed within the hyperbolic band $H_1$ have become unsuppressed, but before the remainder of the transponders become unsuppressed it is arranged that the aerials $I_1$ and $I_2$ radiate individual pulses which are timed so as to arrive at hyperbolic band $H_2$, for example, with a spacing of 8μS which will cause all those transponders disposed within the hyperbolic band $H_2$ which are not suppressed, to be interrogated. Since only those transponders disposed within the hyperbolic band $H_1$ are suppressed at this time, only the transponders that are disposed in the area where the hyperbolic bands $H_1$ and $H_2$ overlap will be interrogated.

Figure 3:
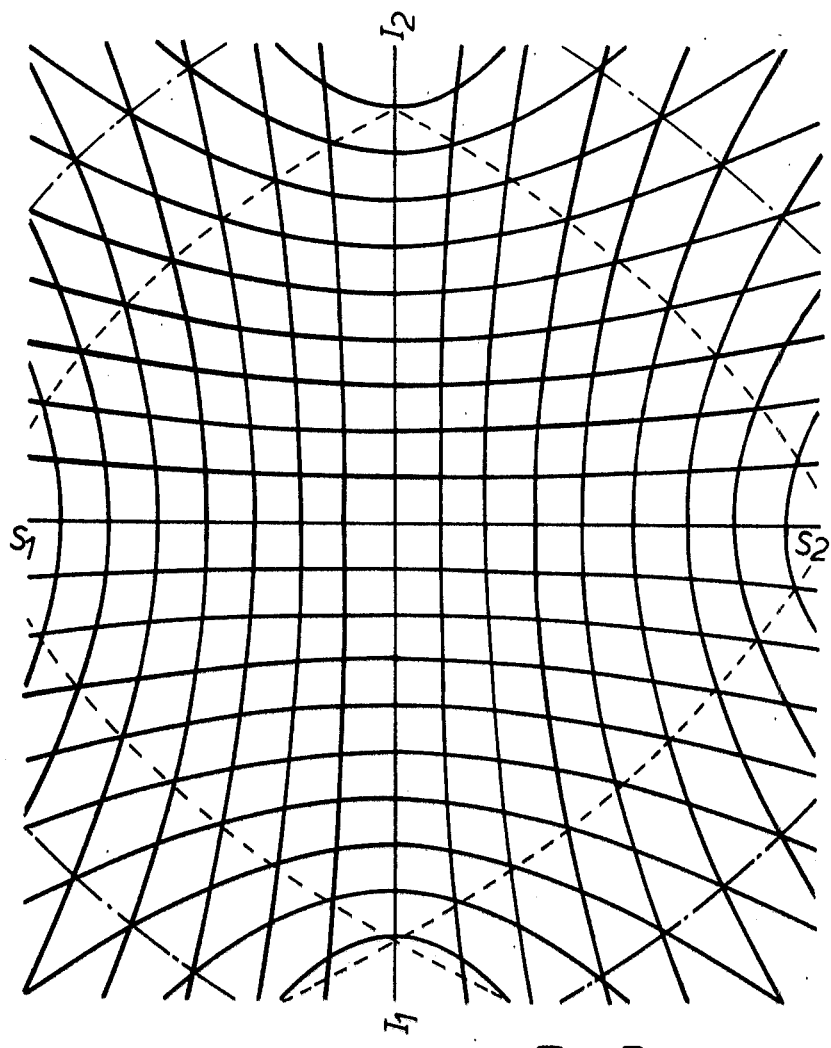
FIG. 3 shows a double hyperbolic grid superimposed on an airfield.

By repeating the procedure and changing the timing of the interrogate pulses radiated by the aerials $I_1$ and $I_2$, the position of the hyperbolic band $H_2$ may be moved successively so that all of the hyperbolic band $H_1$ will be successively interrogated in steps. Similarly, by changing the timing of the suppression pulses radiated by the aerials $S_1$ and $S_2$, the position of the hyperbolic band $H_1$ may be moved successively in step so that together with the movement of the hyperbolic band $H_2$ the whole area of the airfield may be scanned. A typical hyperbolic grid thus obtained with an aerial layout as shown in FIG. 2 is depicted in FIG. 3.

As in the arrangement described with reference to FIG. 1, dependent upon the position of the hyperbolic band $H_2$, there is a high possibility that the individual pulses radiated by the aerials $S_1$ and $S_2$ will cause an additional "image" hyperbolic band to be produced where their spacing is also 2μS but where their order is reversed. The resultant unwanted suppression thus afforded can be prevented by ensuring that the $P_2$ radiated pulse is larger than the $P_1$ radiated pulse at all parts of the airfield. Thus when the pulses $P_1$ and $P_2$ are received in reverse order, the transponder desensitization process will inhibit suppression. There is also a possibility of the suppressing pulses radiated by the aerials $S_1$ and $S_2$ causing spurious interrogation of transponders on an additional hyperbola, however the replies from such a transponder will not be acted upon, nor will they garble the wanted reply since they will be completed before the $I_1$, $I_2$ interrogation pulses are transmitted. The dead time which follows the transponders reply prevent it receiving the second suppression pulse pairs but also prevents it replying to the $I_1$, $I_2$ interrogation.

A problem associated with SSR systems is that of spurious interrogations caused by reflections from various objects on the airfield. For instance a reflected and thus delayed pulse radiated from aerial $I_1$ may interact with either a direct or reflected pulse radiated from aerial $I_2$ to cause unwanted interrogations on any part of the airfield. However since all aircraft except those in the hyperbolic band $H_1$ will have been suppressed before the reflected signals can reach them, a false interrogation by reflection can only occur in the hyperbolic band $H_1$. A method of reducing this is to arrange that a relatively large pulse is radiated from the aerials $I_1$ and $I_2$, which are timed so as to arrive at all parts of the hyperbolic band $H_1$ except the wanted region before the arrival of the pulses from the $S_1$ and $S_2$ aerials. The pulses from the aerials $I_1$ and $I_2$ will therefore desensitize the transponders in the unwanted regions of the hyperbola $H_1$ and thus will prevent their initial suppression. They will then be suppressed by the second suppression pulses and consequently not interrogated by reflected signals. These two pulses will also combine in certain places to cause unwanted interrogation. However, as in the case of the individual $S_1$ and $S_2$ pulses, the resultant replies will not be acted upon nor will they garble the wanted reply. There is of course a grey zone on either side of the intended interrogation position where desensitization may or may not be successful. Initial calculations indicate that all aircraft more than 600 meters distance from the wanted position are certain of desensitization and those more than 300 meters distance will probably be desensitized.

Having caused the transponders in the selected area to be interrogated, it is necessary to determine their position within that area. Probably the simplest method is to calculate the centre of gravity of the pattern of returns from any one transponder (identified by code) in relation to the intersection point of the interrogation and suppression pattern. However, this method suffers from the following problem:

1. If any part of the reply pattern of one aircraft overlaps that of another, then each pattern is distorted and it becomes difficult to find the centre of gravity.

2. The transponder tolerances may not be symmetrically disposed about the nominal pulse spacing. The centre of the pattern will then be displaced from the true position of the aircraft.

3. There is some danger of pattern distortion and thus positional error due to fruit and squitter.

An alternative method of position finding is to use a form of trilateration technique in which the position of a transponder is determined by reference to the relative time of receipt of transponder replies at three or more receiving aerials located, for example on the perimeter of the airfield. By this means the position can be found from a single reply from the transponder although in practice a number of replies would be averaged. Accurate positions can thus be achieved even when two aircraft patterns are almost fully overlapping. Transponder tolerances are of no significance.

By comparing the trilateration position with the position at which the interrogation was aimed, it is possible to eliminate the majority of spurious replies due to reflection, fruit, squitter, mode images, false mode replies etc. Such elimination will not affect the positional accuracy of the remaining reports.

It is considered that bracket decoding should be used in order to simplify the problem of ensuring that the timing comparisons relate to the same transponder data, the time of receipt of each bracket pairs from each of the receiving aerials is transmitted to a central processing unit where the position calculations are made.

The simplest way of transmitting the position information to the central processing unit is by means of wide band RF or coaxial cable links. These are relatively expensive however and are generally not well received at operational airports.

An alternative to this is to provide each receiving station with an accurate (probably crystal-controlled) clock against which the time of receipt of transponder replies can be measured. This time may then be digitally coded for transmission over a narrow band link. A buffer store may be provided to handle the high peak reply rate, due to successive replies from single or closely spaced aircraft. The clock may be used to control the transmission sequence.

In order to maintain synchronisation of the clock and of the transmission pattern it is proposed that a coded pulse train be transmitted from a master station at the start of each complete scan of the airport, e.g. at intervals of some 5 seconds. However in order to ensure that GMC interrogations are only made in the dead time of the local SSR system, it may be necessary to provide synchronising pulses more frequently e.g. at the start of each dead time. This has the further advantage of reducing the requirement for clock accuracy by some 4 orders. The pattern start synchronising pulse would still be required and would be uniquely coded.

Due to the fact that the range requirement of the system described is very short, it is possible to interrogate at a high rate. This would however cause some mutual interference with the local ATC SSR due to transponder capture, suppression and fruit. Although some interference would be slight, any degradation of the existing SSR system should be avoided. This may be achieved by arranging that the interrogations occur in the dead time of the ATC radar. However with a simple position stepping sequence as described, several successive interrogations may well be sent to the same aircraft, whose transponder must clearly be given time (up to 125μS) to recover after replying before the next interrogation. Some 85μS must also be allowed for the initial suppression processors so that a total of some 210μS must elapse between successive interrogations allowing two per SSR dead time and therefore an interrogation rate of some 800 PPS. Typically then to cover an area such as that as Heathrow, including the centre island, some 8,800 interrogations would be required. With the simple position stepping sequence described above, the data interval would be about 11 seconds which is considered too long by a factor of about two. The data rate can be increased by the following means.

1. Use of double "hopping" pattern so that no two adjacent interrogations are fired at the same aircraft. This avoids the need to wait for the transponder reply dead time and allows the PRF and data rate to be doubled. This is considered to be the best solution.

2. Increase the size of the incremental steps in each co-ordinate by a factor of $\sqrt{2}$ to achieve a doubling of the data rate. With trilateration there is no loss of positional accuracy but the resolution of adjacent aircraft would be somewhat degraded.

3. Use a more complex pattern so that interrogations are confined to runways and taxiways. It might be necessary to allow reversion of full area coverage if an aircraft is thought to have gone astray.

4. Use a coarse stepping pattern in areas containing one aircraft reducing the step size in areas containing two or more aircraft. This gives a high data rate and a low interrogation rate, but almost certainly requires relatively wide-band communication between aerial sites. In view of the attractions of narrow-band links the method is not ideal.

In the arrangement so far described with reference to FIGS. 2 and 3 of the drawings it has been assumed that the base lines joining the aerials $I_1$, $I_2$ and $S_1$, $S_2$ bisect each other to produce the (double) hyperbolic grid shown in FIG. 3 of the drawings. However such an arrangement is not well suited to an airport such as Heathrow having a central island, due to the shadows caused by the central buildings and the need for an annular form of coverage.

Figure 4:
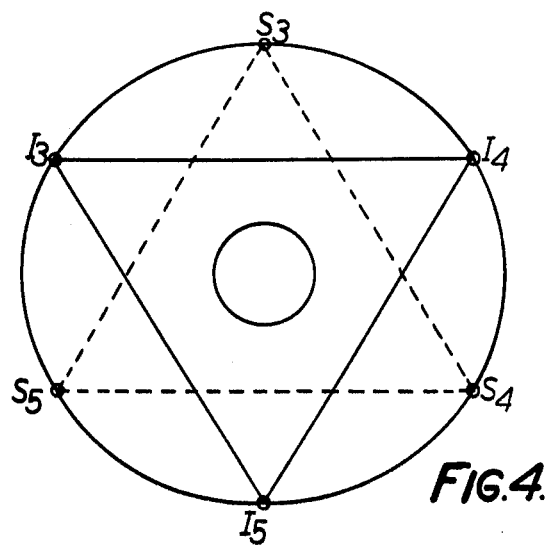
FIG. 4 is a modified aerial layout for use with an airfield of annular form.
Figure 5:
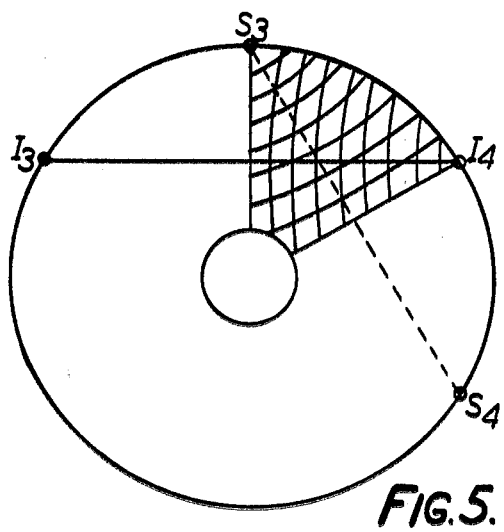
FIG. 5 depicts an interrogation area of an airfield of annular form.

In FIG. 4 of the accompanying drawings there is shown a modified aerial layout which is suitable for use with an airport having an airfield of annular form. Instead of two pairs of aerials $S_1$, $S_2$ and $I_1$, $I_2$ being used as in the arrangement of FIG. 1, two sets of three aerials $S_3$, $S_4$, $S_5$ and $I_3$, $I_4$, $I_5$ are provided disposed around the perimeter of the airfield, pairs of the two sets of three aerials being chosen and used as in the arrangement of FIG. 2 to transmit the suppression and interrogate pulses dependent upon the particular part of the annular airfield being interrogated. In FIG. 5 of the accompanying drawings the interrogation area using the aerials $S_3$, $S_4$ and $I_3$, $I_4$ is shown.

What we claim is:

1. A method of selectively interrogating secondary surveillance radar transponders carried by vehicles located within a predetermined ground area for the purpose of identifying and locating those vehicles within that ground area, the method comprising the steps of radiating a first pair of interrogate pulses to cause the transponders located in a band of said area to be interrogated, determining the position of a required one of said transponders, radiating pairs of suppression pulses to cause all but a required one of the transponders in said band to be suppressed, radiating a second pair of interrogate pulses to cause the required one of said transponders to be interrogated and receiving the reply transmitted from the said one transponder for identification and location purposes.

2. A method as claimed in claim 1, in which the step of radiating a second pair of interrogate pulses is performed when all but a required one of said transponders in the band are suppressed.

3. A method as claimed in claim 1, in which the time relationship between the first pair of interrogate pulses is varied in steps so that the predetermined area is traversed in steps.

4. A method as claimed in claim 3, in which the predetermined area is traversed in one direction in a series of bands and is then traversed in the opposite direction in a series of bands.

5. Apparatus for selectively interrogating secondary surveillance radar transponders carried by vehicles located within a predetermined ground area for the purpose of identifying and locating those vehicles within that ground area comprising means for radiating a first pair of interrogate pulses to cause the transponders located in a band of said area to be interrogated, means for determining the position of a required one of said transponders, means for radiating pairs of suppression pulses to cause all but a required one of the transponders in said band to be suppressed, means for radiating a second pair of interrogate pulses to cause the required one of said transponders to be interrogated and for receiving the reply transmitted from the said one transponder for identification and location purposes, wherein said means for radiating a first pair of interrogate pulses include first and second aerials, and means for positioning said first and second aerials on the perimeter of the predetermined area in spaced apart relationship, and said means for radiating pairs of suppression pulses include a third aerial, and means for positioning said third aerial on the perimeter of said area.

6. Apparatus for carrying out the invention as claimed in claim 5, wherein said means for radiating pairs of suppression pulses further comprise a fourth aerial and means for locating said fourth aerial on the perimeter of the predetermined area in spaced apart relationship, the third and fourth aerials being arranged to radiate particular ones of the pairs of suppression pulses.

7. Apparatus as claimed in claim 5, in which the third aerial is arranged to receive the reply of the required one of the transponders.

8. Apparatus as claimed in claim 5, in which and three aerials are arranged to receive the reply of the required one of the transponders for determining its position within the predetermined area.

9. Apparatus as claimed in claim 8 further comprising a fifth aerial, and means for positioning the fifth aerial on the perimeter of said predetermined area, wherein said means for radiating said first and second pair of suppression pulses, and said means for radiating a pair of interrogate pulses comprise said first, second, third, fourth and fifth aerials and means for transmitting pairs of interrogate and suppression pulses from the five aerials.

10. Apparatus as claimed in claim 5 wherein said means for radiating a first pair of interrogate pulses and a second pair of interrogate pulses comprise means for generating a pair of pulses having a predetermined time relationship therebetween, and wherein said means for radiating pairs of suppression pulses comprise means for generating a pair of pulses having another predetermined time relationship therebetween.

11. A method of selectively interrogating secondary surveillance radar transponders carried by vehicles located within a predetermined ground area for the purpose of identifying and locating those vehicles within that ground area, the method comprising the steps of radiating a first pair of suppression pulses to cause transponders located in a first band of said area to be suppressed for a first predetermined period, radiating a second pair of suppression pulses to cause all the remaining transponders located within the predetermined area to be suppressed for a second predetermined period, and radiating a pair of interrogate pulses after the expiration of said first period but before the expiration of said second period to cause the transponders located in a second band of said area which is transverse to said first band to be interrogated, so that only those transponders that are located within the overlapping parts of said two bands are caused to be interrogated.

12. A method as claimed in claim 11, in which the time relationship between the suppression pulses and the time relationship between the interrogate pulses is varied in steps so that the said one band is caused to traverse said area in one direction in steps and the said second band is caused to traverse the said area in another direction in steps, whereby the overlapping part of said two bands is caused to traverse the whole of the predetermined area for selective interrogation purposes.

13. A method as claimed in claim 12, in which the predetermined area is caused to be traversed in hops so that immediately adjacent overlapping parts of said two bands are not interrogated one immediately after the other.

14. Apparatus for selectively interrogating secondary surveillance radar transponders carried by vehicles located within a predetermined ground area for the purpose of identifying and locating those vehicles within that ground area, comprising means for radiating a first pair of suppression pulses for causing transponders located in a first band of said area to be suppressed for a first predetermined period, means for radiating a second pair of suppression pulses to cause all the remaining transponders located within the predetermined area to be suppressed for a second predetermined period, means for radiating a pair of interrogate pulses after the expiration of said first period but before the expiration of said second period in a second band of said area which is transverse to said first band to be interrogated for causing the transponders located in said second band of said area that is common with said first band of said area to be interrogated, wherein said means for radiating a first pair of suppression pulses comprise first and second aerials, and means for positioning said first and second aerials on the perimeter of the predetermined area in spaced apart relationship, and wherein said means for radiating a pair of interrogate pulses comprise third and fourth aerials, and means for positioning said third and fourth aerials on the perimeter of said predetermined area in spaced apart relationship, and spaced from the first and second aerials.

15. Apparatus as claimed in claim 10 further comprising means for preventing the interrogation of transponders that are located outside of the band of an area to be interrogated comprising means for generating an additional pulse following the transmission of a pair of interrogate pulses, wherein the second pulse of said pair of interrogate pulses and said additional pulse have said another predetermined time relationship therebetween.

16. Apparatus as claimed in claim 14 wherein said means for radiating a pair of interrogate pulses comprise means for generating a pair of pulses having a predetermined time relationship therebetween, and wherein said means for radiating pairs of suppression pulses comprise means for generating a pair of pulses having another predetermined time relationship therebetween.

17. Apparatus as claimed in claim 16 further comprising means for preventing the interrogation of transponders that are not intended to be interrogated comprising means for generating an additional pulse following the transmission of a pair of pulses, wherein the second pulse of said pair of pulses and said additional pulse have said another predetermined time relationship therebetween.

* * * * *